(12) United States Patent
Mathew et al.

(10) Patent No.: US 10,261,540 B2
(45) Date of Patent: Apr. 16, 2019

(54) METHODS FOR FABRICATING DISPLAY STRUCTURES

(71) Applicant: Apple Inc., Cupertino, CA (US)

(72) Inventors: Dinesh C. Mathew, Fremont, CA (US); Thomas W. Wilson, Jr., Pleasanton, CA (US); Victor H. Yin, Cupertino, CA (US); Bryan W. Posner, La Selva Beach, CA (US); Chris Ligtenberg, San Carlos, CA (US); Brett W. Degner, Menlo Park, CA (US); Peteris K. Augenbergs, San Francisco, CA (US); John Z. Zhong, Saratoga, CA (US); Steve Hotelling, Los Gatos, CA (US); Lynn Youngs, Cupertino, CA (US); Kuo-Hua Sung, San Jose, CA (US)

(73) Assignee: Apple Inc., Cupertino, CA (US)

( * ) Notice: Subject to any disclaimer, the term of this patent is extended or adjusted under 35 U.S.C. 154(b) by 8 days.

(21) Appl. No.: 15/428,014

(22) Filed: Feb. 8, 2017

(65) Prior Publication Data
US 2017/0147036 A1 May 25, 2017

Related U.S. Application Data

(63) Continuation of application No. 14/729,859, filed on Jun. 3, 2015, now Pat. No. 9,575,354, which is a
(Continued)

(51) Int. Cl.
*G02F 1/1362* (2006.01)
*G02F 1/1335* (2006.01)
(Continued)

(52) U.S. Cl.
CPC .......... *G06F 1/1616* (2013.01); *G02F 1/1368* (2013.01); *G02F 1/13306* (2013.01);
(Continued)

(58) Field of Classification Search
CPC ... G02F 1/133512; G02F 2001/136218; G02F 1/13454; G02F 1/133528
See application file for complete search history.

(56) References Cited

U.S. PATENT DOCUMENTS

| 4,769,680 A | 9/1988 | Resor, III et al. |
| 5,032,007 A | 7/1991 | Silverstein et al. |

(Continued)

FOREIGN PATENT DOCUMENTS

| JP | 06/245209 | 2/1994 |
| JP | 3387136 | 9/1994 |

(Continued)

OTHER PUBLICATIONS

"LCD with Embedded Camera for Picture Telephone," IBM Corporation Research Disclosure 42572, Sep. 1999.

*Primary Examiner* — Jia X Pan
(74) *Attorney, Agent, or Firm* — Treyz Law Group, P.C.; G. Victor Treyz; David K. Cole

(57) ABSTRACT

An electronic device display may have a color filter layer and a thin film transistor layer. A layer of liquid crystal material may be interposed between the color filter layer and the thin film transistor layer. A layer of polarizer may be laminated onto the surface of the color filter layer. Laser trimming may ensure that the edges of the polarizer are even with the edges of the color filter layer. The thin film transistor layer may have an array of thin film transistors that control pixels of the liquid crystal material in the display. Driver circuitry may be used to control the array. The driver circuitry may be encapsulated in a planarized encapsulant on the thin film transistor layer or may be mounted to the underside of the color filter layer. Conductive structures may connect driver circuitry on the color filter layer to the thin film transistor layer.

13 Claims, 7 Drawing Sheets

Related U.S. Application Data continuation of application No. 14/321,533, filed on Jul. 1, 2014, now Pat. No. 9,069,525, which is a continuation of application No. 13/249,828, filed on Sep. 30, 2011, now Pat. No. 8,767,141, which is a continuation of application No. 12/691,715, filed on Jan. 21, 2010, now Pat. No. 8,743,309.

(60) Provisional application No. 61/259,989, filed on Nov. 10, 2009.

(51) Int. Cl.
*G02F 1/1345* (2006.01)
*G06F 1/16* (2006.01)
*H01J 9/20* (2006.01)
*G02F 1/1368* (2006.01)
*G02F 1/133* (2006.01)
*G02F 1/1333* (2006.01)

(52) U.S. Cl.
CPC ...... *G02F 1/13452* (2013.01); *G02F 1/13454* (2013.01); *G02F 1/133512* (2013.01); *G02F 1/133514* (2013.01); *G02F 1/133528* (2013.01); *G06F 1/1605* (2013.01); *G06F 1/1613* (2013.01); *G06F 1/1686* (2013.01); *H01J 9/205* (2013.01); *G02F 2001/133388* (2013.01); *G02F 2001/136218* (2013.01); *G02F 2203/01* (2013.01); *H01J 2211/44* (2013.01); *Y10T 156/108* (2015.01)

(56) References Cited

U.S. PATENT DOCUMENTS

| | | | |
|---|---|---|---|
| 5,359,206 A | 10/1994 | Yamamoto et al. | |
| 5,481,430 A | 1/1996 | Miyagawa et al. | |
| 5,539,550 A | 7/1996 | Spitzer et al. | |
| 5,572,343 A | 11/1996 | Okamura et al. | |
| 5,623,392 A | 4/1997 | Ma | |
| 5,631,753 A | 5/1997 | Hamaguchi et al. | |
| 5,678,483 A | 10/1997 | Johnson | |
| 5,708,561 A | 1/1998 | Huilgol et al. | |
| 5,739,800 A | 4/1998 | Lebby et al. | |
| 5,748,270 A | 5/1998 | Smith | |
| 5,760,858 A | 6/1998 | Hodson et al. | |
| 5,851,411 A | 12/1998 | An et al. | |
| 5,889,568 A | 3/1999 | Scraphim et al. | |
| 5,940,153 A | 8/1999 | Castaneda et al. | |
| 5,965,916 A | 10/1999 | Chen | |
| 5,988,827 A | 11/1999 | Lee et al. | |
| 5,990,986 A | 11/1999 | Song et al. | |
| 6,104,461 A | 8/2000 | Zhang et al. | |
| 6,177,214 B1 | 1/2001 | Yokoyama et al. | |
| 6,278,504 B1 | 8/2001 | Sung | |
| 6,335,773 B1 | 1/2002 | Kamei et al. | |
| 6,429,057 B1 | 8/2002 | Hong et al. | |
| 6,462,806 B2 | 10/2002 | Zhang et al. | |
| 6,483,719 B1 | 11/2002 | Bachman | |
| 6,515,729 B1 * | 2/2003 | Hoshino ........... | G02F 1/133305 349/113 |
| 6,525,786 B1 | 2/2003 | Ono | |
| 6,532,152 B1 | 3/2003 | White | |
| 6,570,757 B2 | 5/2003 | DiFonzo et al. | |
| 6,583,439 B2 | 6/2003 | Yamazaki et al. | |
| 6,646,689 B2 | 11/2003 | Matsuda | |
| 6,776,497 B1 | 8/2004 | Huppi et al. | |
| 6,842,211 B2 | 1/2005 | Katsura | |
| 6,919,678 B2 | 7/2005 | Ozolins et al. | |
| 6,940,564 B2 | 9/2005 | Murden et al. | |
| 6,977,808 B2 | 12/2005 | Lam et al. | |
| 7,013,558 B2 | 3/2006 | Bachman | |
| 7,035,090 B2 | 4/2006 | Tanaka et al. | |
| 7,068,343 B2 * | 6/2006 | Saitoh ............... | G02F 1/133308 349/110 |
| 7,092,066 B2 | 8/2006 | Matsuda | |
| 7,110,059 B2 | 9/2006 | Zhang | |
| 7,133,104 B2 | 11/2006 | Kim et al. | |
| 7,161,185 B2 | 1/2007 | Yamazaki et al. | |
| 7,188,965 B2 | 3/2007 | Chang et al. | |
| 7,217,588 B2 | 5/2007 | Hartzell et al. | |
| 7,227,185 B2 | 6/2007 | Lin | |
| 7,237,941 B2 | 7/2007 | Hsieh et al. | |
| 7,245,333 B2 | 7/2007 | Nam et al. | |
| 7,253,869 B1 | 8/2007 | Russell et al. | |
| 7,271,871 B2 | 9/2007 | Jen et al. | |
| 7,282,380 B2 | 10/2007 | Maruyama et al. | |
| 7,286,173 B2 | 10/2007 | Zhang et al. | |
| 7,362,395 B2 | 4/2008 | Kim et al. | |
| 7,420,608 B2 | 9/2008 | Yamasaki | |
| 7,425,749 B2 | 9/2008 | Hartzell et al. | |
| 7,443,460 B2 | 10/2008 | Park | |
| 7,468,774 B2 | 12/2008 | Sakama | |
| 7,489,291 B2 | 2/2009 | Yamazaki et al. | |
| 7,506,436 B2 | 3/2009 | Bachman | |
| 7,522,236 B2 | 4/2009 | Gettemy et al. | |
| 7,525,629 B2 | 4/2009 | Konuma et al. | |
| 7,528,912 B2 | 5/2009 | Zhang et al. | |
| 7,551,358 B2 | 6/2009 | Lee et al. | |
| 7,569,410 B2 | 8/2009 | Hartzell et al. | |
| 7,582,904 B2 | 9/2009 | Fujii et al. | |
| 7,585,121 B2 | 9/2009 | Tsai | |
| 7,586,565 B2 | 9/2009 | Kao | |
| 7,618,683 B2 | 11/2009 | Tsuchimura | |
| 7,629,613 B2 | 12/2009 | Sohn et al. | |
| 7,663,607 B2 | 2/2010 | Hotelling et al. | |
| 7,697,092 B2 | 4/2010 | Yi et al. | |
| 7,728,906 B2 | 6/2010 | Bilbrey | |
| 7,728,937 B2 | 6/2010 | Kume et al. | |
| 7,736,936 B2 | 6/2010 | Tanaka | |
| 7,764,335 B2 | 7/2010 | Tanaka et al. | |
| 7,790,487 B2 | 9/2010 | Shih et al. | |
| 7,800,707 B2 | 9/2010 | Hsieh et al. | |
| 7,812,920 B2 | 10/2010 | Iino | |
| 7,813,042 B2 | 10/2010 | Mather et al. | |
| 7,821,561 B2 | 10/2010 | Tsuboi | |
| 7,829,391 B2 | 11/2010 | Okada et al. | |
| 7,830,370 B2 | 11/2010 | Yamazaki et al. | |
| 7,852,440 B2 | 12/2010 | Kunimori et al. | |
| 7,859,606 B2 | 12/2010 | Higaki et al. | |
| 7,868,957 B2 | 1/2011 | Yamazaki et al. | |
| 7,883,232 B2 | 2/2011 | Bang | |
| 7,894,021 B2 | 2/2011 | Yang et al. | |
| 7,898,585 B2 | 3/2011 | Nam | |
| 7,903,206 B2 | 3/2011 | Nakamura et al. | |
| 7,907,230 B2 | 3/2011 | Goto et al. | |
| 7,924,362 B2 | 4/2011 | Slobodin | |
| 7,929,046 B2 | 4/2011 | Okamura | |
| 7,929,075 B2 | 4/2011 | Lee | |
| 7,933,123 B2 | 4/2011 | Wang et al. | |
| 7,936,346 B2 | 5/2011 | Kunimori et al. | |
| 7,995,183 B2 | 8/2011 | Yamazaki et al. | |
| 8,004,629 B2 | 8/2011 | Miyata | |
| 8,013,454 B2 | 9/2011 | Yamashita et al. | |
| 8,018,558 B2 | 9/2011 | Kubota | |
| 8,033,708 B2 | 10/2011 | Tsubaki | |
| 8,049,221 B2 | 11/2011 | Komori | |
| 8,059,231 B2 | 11/2011 | Kim | |
| 8,130,354 B2 | 3/2012 | Kimura | |
| 8,149,279 B2 | 4/2012 | Guo | |
| 8,154,679 B2 | 4/2012 | Kim | |
| 8,194,138 B2 | 6/2012 | Shen | |
| 8,199,477 B2 | 6/2012 | Mathew et al. | |
| 8,203,677 B2 | 6/2012 | Sakai | |
| 8,248,559 B2 | 8/2012 | Morita | |
| 8,253,875 B2 | 8/2012 | Kim | |
| 8,253,890 B2 | 8/2012 | Zhong et al. | |
| 8,274,814 B2 | 9/2012 | Tokunaga et al. | |
| 8,350,985 B2 | 1/2013 | Hasegawa | |
| 8,369,702 B2 | 2/2013 | Sanford et al. | |
| 8,395,722 B2 | 3/2013 | Mathew et al. | |
| 8,408,780 B2 | 4/2013 | Mathew et al. | |
| 8,456,586 B2 | 6/2013 | Mathew et al. | |
| 8,467,177 B2 | 6/2013 | Mathew et al. | |

(56) References Cited

U.S. PATENT DOCUMENTS

| | | |
|---|---|---|
| 8,508,495 B2 | 8/2013 | Hotelling et al. |
| 8,711,304 B2 | 4/2014 | Mathew et al. |
| 8,731,618 B2 | 5/2014 | Jarvis et al. |
| 8,749,496 B2 | 6/2014 | Chang et al. |
| 8,767,141 B2 | 7/2014 | Mathew et al. |
| 8,786,557 B2 | 7/2014 | Noguchi et al. |
| 2004/0095526 A1 | 5/2004 | Yamabuchi et al. |
| 2004/0212555 A1 | 10/2004 | Falco |
| 2005/0052737 A1 | 3/2005 | Amemiya et al. |
| 2005/0264689 A1 | 12/2005 | Yang et al. |
| 2005/0266591 A1 | 12/2005 | Hideo |
| 2005/0270438 A1 | 12/2005 | Konuma et al. |
| 2006/0125982 A1 | 6/2006 | Lin et al. |
| 2006/0138296 A1 | 6/2006 | DeLuga |
| 2006/0148425 A1 | 7/2006 | Carlson |
| 2006/0176417 A1 | 8/2006 | Wu et al. |
| 2006/0223006 A1 | 10/2006 | Shimada et al. |
| 2006/0279652 A1 | 12/2006 | Yang et al. |
| 2007/0002216 A1 | 1/2007 | Chang et al. |
| 2007/0126966 A1 | 6/2007 | Takahashi |
| 2007/0197677 A1 | 8/2007 | Tsuchimura et al. |
| 2007/0291172 A1 | 12/2007 | Kouzimoto et al. |
| 2008/0239754 A1 | 10/2008 | Kang et al. |
| 2008/0266469 A1 | 10/2008 | Chen et al. |
| 2009/0085848 A1 | 4/2009 | Huang et al. |
| 2009/0091673 A1 | 4/2009 | Chen et al. |
| 2009/0147179 A1 | 6/2009 | Yamashita et al. |
| 2009/0153762 A1 | 6/2009 | Kuwabara et al. |
| 2009/0244410 A1 | 10/2009 | Miyata |
| 2009/0273550 A1 | 11/2009 | Vieri et al. |
| 2009/0279284 A1 | 11/2009 | Takeuchi et al. |
| 2009/0286001 A1 | 11/2009 | Kanke et al. |
| 2010/0026656 A1 | 2/2010 | Hotelling et al. |
| 2010/0060816 A1* | 3/2010 | Fukai ............... G02F 1/133615 349/58 |
| 2010/0079942 A1 | 4/2010 | Yamamoto et al. |
| 2010/0097525 A1 | 4/2010 | Mino |
| 2010/0100202 A1 | 4/2010 | Chen et al. |
| 2010/0182538 A1 | 7/2010 | Takata |
| 2010/0207857 A1 | 8/2010 | Gu et al. |
| 2010/0225844 A1 | 9/2010 | Kamada |
| 2010/0302478 A1 | 12/2010 | Nakagawa et al. |
| 2010/0309102 A1 | 12/2010 | Jung |
| 2010/0315570 A1 | 12/2010 | Mathew et al. |
| 2010/0321325 A1 | 12/2010 | Springer et al. |
| 2011/0001706 A1 | 1/2011 | Sanford et al. |
| 2011/0005662 A1 | 1/2011 | Sung |
| 2011/0051411 A1 | 3/2011 | Kim et al. |
| 2011/0063550 A1 | 3/2011 | Gettemy et al. |
| 2011/0109829 A1 | 5/2011 | Mathew et al. |
| 2011/0149139 A1 | 6/2011 | Chang |
| 2011/0244656 A1 | 10/2011 | Dairiki et al. |
| 2011/0285948 A1 | 11/2011 | Hakoi et al. |
| 2012/0014687 A1 | 1/2012 | Sanford et al. |
| 2012/0020000 A1 | 1/2012 | Mathew et al. |
| 2012/0020001 A1 | 1/2012 | Mathew et al. |
| 2012/0020700 A1 | 1/2012 | Yamada |
| 2012/0050958 A1 | 3/2012 | Sanford et al. |
| 2012/0050975 A1 | 3/2012 | Garelli et al. |
| 2012/0105400 A1 | 5/2012 | Mathew et al. |
| 2012/0106063 A1 | 5/2012 | Mathew et al. |
| 2013/0188305 A1 | 7/2013 | Mathew et al. |
| 2013/0215642 A1 | 8/2013 | Mathew et al. |
| 2015/0138710 A1 | 5/2015 | Mathew et al. |

FOREIGN PATENT DOCUMENTS

| | | |
|---|---|---|
| JP | 00/330090 | 11/2000 |
| JP | 01/117077 | 4/2001 |
| JP | 04/135275 | 4/2004 |
| JP | 05/176151 | 6/2005 |
| JP | 09/015272 | 1/2009 |
| JP | 10/219948 | 9/2010 |
| KR | 100400714 | 9/2003 |
| KR | 04/017693 | 2/2004 |
| KR | 100809277 | 2/2008 |
| KR | 1020080058911 | 6/2008 |
| KR | 100856092 | 9/2008 |
| KR | 1020080089908 | 10/2008 |
| WO | WO 08/120879 | 10/2008 |

* cited by examiner

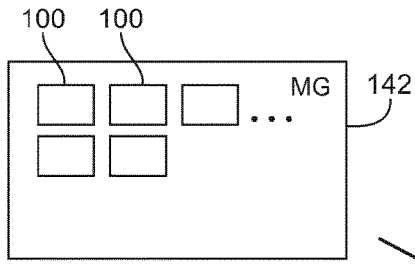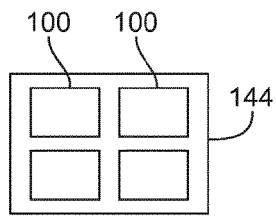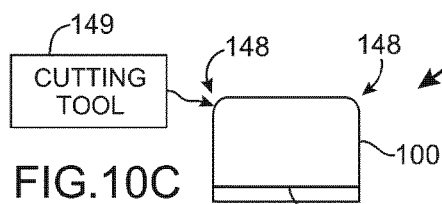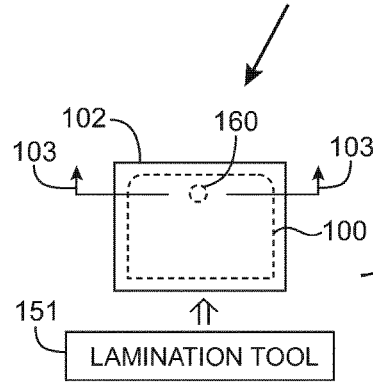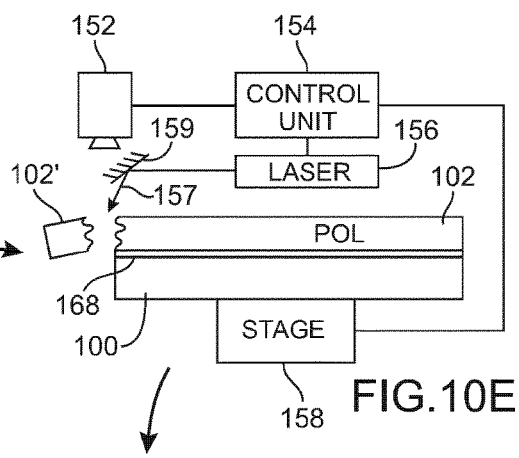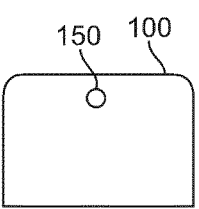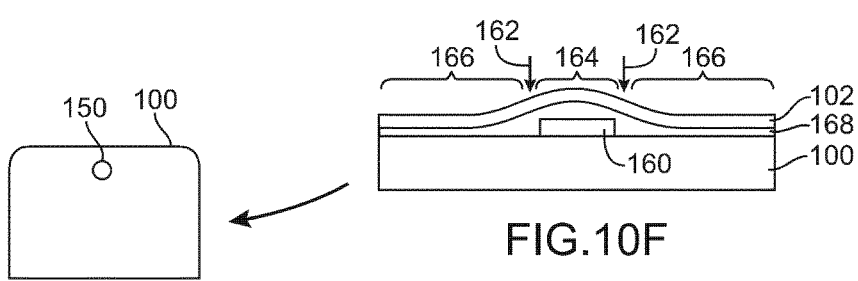

METHODS FOR FABRICATING DISPLAY STRUCTURES

This application is a continuation of patent application Ser. No. 14/729,859, filed Jun. 3, 2015, which is a continuation of patent application Ser. No. 14/321,533, filed Jul. 1, 2014, now U.S. Pat. No. 9,069,525, which is a continuation of patent application Ser. No. 13/249,828, filed Sep. 30, 2011, now U.S. Pat. No. 8,767,141, which is a continuation of patent application Ser. No. 12/691,715, filed Jan. 21, 2010, now U.S. Pat. No. 8,743,309, which claims the benefit of provisional patent application Ser. No. 61/259,989, filed Nov. 10, 2009, all of which are hereby incorporated by reference herein in their entireties. This application claims the benefit of and claims priority to patent application Ser. No. 14/729,859, filed Jun. 3, 2015, patent application Ser. No. 14/321,533, filed Jul. 1, 2014, now U.S. Pat. No. 9,069,525, patent application Ser. No. 13/249,828, filed Sep. 30, 2011, now U.S. Pat. No. 8,767,141, patent application Ser. No. 12/691,715, filed Jan. 21, 2010, now U.S. Pat. No. 8,743,309, and provisional patent application No. 61/259,989, filed Nov. 10, 2009.

BACKGROUND

This invention relates to electronic devices and, more particularly, to display structures for electronic devices such as portable computers.

Portable computers typically have upper and lower housing portions that are connected by a hinge. The lower housing portion contains components such as printed circuit boards, disk drives, a keyboard, and a battery. The upper housing portion contains a display. When the computer is in an open configuration, the upper housing portion is vertical and the display is visible to the user of the portable computer. When the computer is closed, the upper housing lies flat against the lower housing. This protects the display and keyboard and allows the portable computer to be transported.

Portable computer displays that are based on liquid crystal display technology include layers of polarizer. The outermost polarizer layer is generally formed on the outer surface of a color filter glass layer. The polarizer layer often has dimensions that are slightly larger than the color filter glass. Use of an oversized polarizer of this type helps to ensure that the color filter glass layer is completely covered with polarizer. However, the overhanging edges of the oversized layer of polarizer can give rise to reliability problems when the display is used in a product. As a result, undersized polarizer layers are sometimes used. With this approach, the size of the polarizer is chosen so as to be smaller than the dimensions of the color filter glass. Overlapping polarizer edges are avoided, but a peripheral region on the surface of the color filter glass is uncovered. This uncovered region can be unsightly unless hidden from view by a bezel. Use of a large bezel, in turn, may not be aesthetically appealing, particularly in modern devices.

It would therefore be desirable to be able to produce improved displays for electronic devices.

SUMMARY

An electronic device display such as a computer may have a housing. A display may be mounted in the housing. The display may have a color filter layer and a thin film transistor layer. A layer of liquid crystal material may be interposed between the color filter layer and the thin film transistor layer. A layer of polarizer may be laminated onto the surface of the color filter layer. Laser trimming may ensure that the edges of the polarizer are even with the edges of the color filter layer. A shim may be used to help prevent the polarizer layer from adhering to the color filter layer in certain regions. Using laser trimming, the edges of the shim may be traced to cut an opening in the polarizer. The opening may be used to form a camera window for a camera module.

The thin film transistor layer may have an array of thin film transistors that control pixels of the liquid crystal material in the display. Driver circuitry may be used to control the array. The driver circuitry may be encapsulated in a planarized encapsulant on the thin film transistor layer or may be mounted to the underside of the color filter layer. Ink-jet-printed conductive structures may connect driver circuitry on the color filter layer to the thin film transistor layer. A layer of black or non-black ink may be interposed between the driver circuitry and the color filter layer to which the driver circuitry is mounted.

Further features of the invention, its nature and various advantages will be more apparent from the accompanying drawings and the following detailed description of the preferred embodiments.

BRIEF DESCRIPTION OF THE DRAWINGS

FIG. 10A is a top view of a mother glass panel on which structures for multiple displays have been formed in accordance with an embodiment of the present invention.

FIG. 10B is a top view of a section of glass that contains multiple displays that have been cut from the mother glass panel of FIG. 10A in accordance with an embodiment of the present invention.

FIG. 10C is a top view of display structures for an individual display that have been cut from the glass piece of FIG. 10B in accordance with an embodiment of the present invention.

FIG. 10D is a top view of the display structures of FIG. 10C following lamination of an oversized polarizer layer in accordance with an embodiment of the present invention.

FIG. 10E is a side view of an illustrative laser cutting tool that may be used to trim excess polarizer material from the edges of the display structures after the polarizer material has been attached to the display structures as shown in FIG. 10D in accordance with an embodiment of the present invention.

FIG. 10F is a cross-sectional view of the display structures taken along line 103-103 of FIG. 10D prior to laser removal of a circular shim layer in accordance with an embodiment of the present invention.

FIG. 10G is a top view of the display structures after laser edge trimming and laser shim removal operations have been completed in accordance with an embodiment of the present invention.

DETAILED DESCRIPTION

Figure 1:
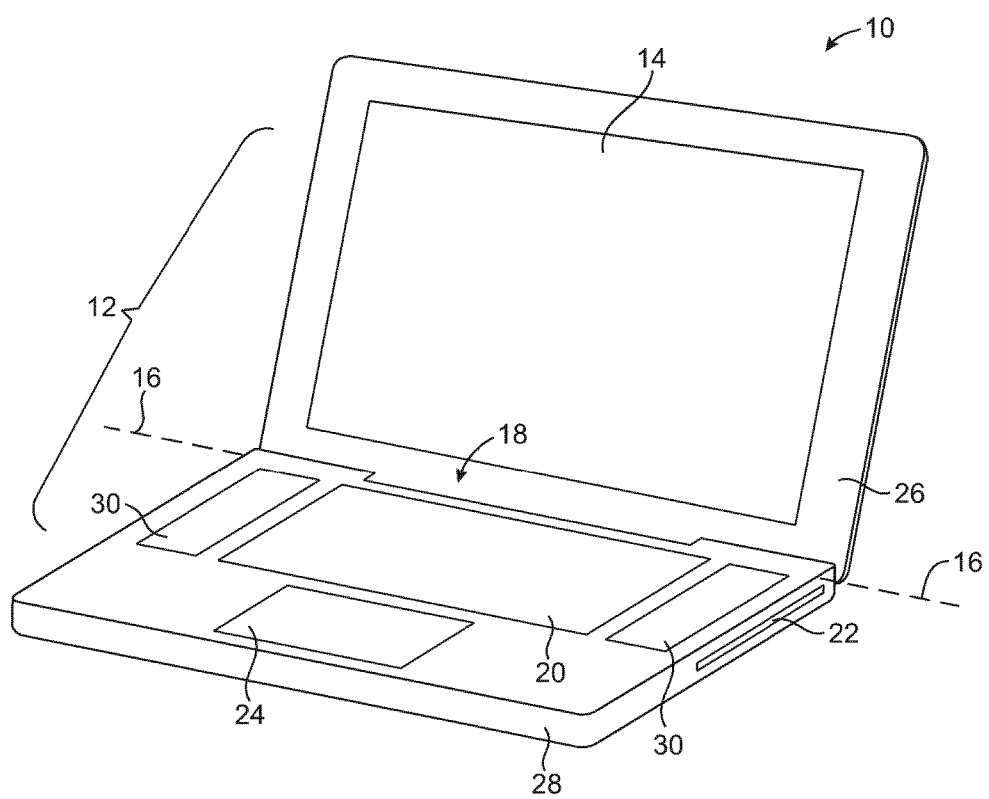
FIG. 1 is a perspective view of an illustrative portable computer with display structures in accordance with an embodiment of the present invention.

An illustrative electronic device such as a portable computer in which display structures may be provided is shown in FIG. 1. As shown in FIG. 1, portable computer 10 may have housing 12. Housing 12, which is sometimes referred to as a case, may be formed from one or more individual structures. For example, housing 12 may have a main structural support member that is formed from a solid block of machined aluminum or other suitable metal. One or more additional structures may be connected to the housing 12. These structures may include, for example, internal frame members, external coverings such as sheets of metal, etc. Housing 12 and its associated components may, in general, be formed from any suitable materials such as such as plastic, ceramics, metal, glass, composites, etc. An advantage of forming housing 12 at least partly from metal is that metal is durable and attractive in appearance. Metals such as aluminum may be anodized to form an insulating oxide coating.

In general, the components of portable computer 10 can be formed from any suitable materials. As examples, the components of portable computer 10 may be formed from materials such as metals (e.g., aluminum, stainless steel, alloys of metals, electroplated metals, plated and other coated metals, etc.), plastics (e.g., polycarbonate (PC) plastics, acrylonitrile butadiene styrene (ABS) plastics, thermoplastics, PC/ABS plastic blends, etc.), composite materials (e.g., carbon fibers or other fibers bound by a binder such as a polymer resin), plastics that have been injection molded around metal structures, laminated plastic layers, ceramics, metal, glass, composites, metal-filled epoxy, other suitable materials, and combinations of these and other materials. Components of portable computer 10 which are described herein as being formed from one or more specific materials (e.g., housing 12 which is sometimes described herein as being formed from machined aluminum as an example) can be formed from any of the above-mentioned materials, other suitable materials, or combinations of such materials.

Housing 12 may have an upper portion 26 and a lower portion 28. Lower portion 28 may be referred to as the base or main unit of computer 10 and may contain components such as a hard disk drive, battery, and main logic board. Upper portion 26, which is sometimes referred to as a cover, lid, or display housing, may rotate relative to lower portion 28 about rotational axis 16. Portion 18 of computer 10 may contain a hinge and associated clutch structures and is sometimes referred to as a clutch barrel.

Lower housing portion 28 may have a slot such as slot 22 through which optical disks may be loaded into an optical disk drive. Lower housing portion may also have a touchpad such as touchpad 24 and may have keys 20. If desired, additional components may be mounted to upper and lower housing portions 26 and 28. For example, upper and lower housing portions 26 and 28 may have ports to which cables can be connected (e.g., universal serial bus ports, an Ethernet port, a Firewire port, audio jacks, card slots, etc.). Buttons and other controls may also be mounted to housing 12. Speaker openings such as speaker openings 30 may be formed in lower housing portion 28 by creating an array of small openings (perforations) in the surface of housing 12.

A display such as display 14 may be mounted within upper housing portion 26. Display 14 may be, for example, a liquid crystal display (LCD), organic light emitting diode (OLED) display, or plasma display (as examples). Display 14 may contain a number of layers of material. These display structures may include, for example, layers of optically transparent materials such as plastic and glass. Layers of plastic and optical adhesive may also be incorporated into display 14. In a liquid crystal display, which is sometimes described herein as an example, a layer of liquid crystal material may be formed between a color filter glass layer and a thin film transistor glass layer. The thin film transistor glass layer may include an array of thin film transistors. The transistors may drive the image pixels in the display. The color filter glass may be used to impart colors to the pixels. Layers of polarizer may be formed above and below the color filter glass and the thin film transistor glass. Display structures in display 14 may also include backlight structures such as a reflective sheet, a light guide panel, and layers of optical films such as diffuser layers and light collimating layers.

Computer 10 may have input-output components such as touch pad 24. Touch pad 24 may include a touch sensitive surface that allows a user of computer 10 to control computer 10 using touch-based commands (gestures). A portion of touchpad 24 may be depressed by the user when the user desires to "click" on a displayed item on screen 14.

A cross-sectional side view of a portion of upper housing 26 of device 10 (FIG. 1) in which display structures 106 have been mounted. In general, display structures 106 may be formed from any suitable materials (e.g., plastic, glass, other optically suitable materials, etc.). Upper housing 26 may, for example, be formed from machined aluminum. If desired, upper housing 26 may be formed from other suitable materials such as plastics, composites, etc. Elastomeric gasket 104 may be used to provide a soft interface between potentially fragile glass layers in structures 106 and housing 26.

Display structures 106 may produce an image using any suitable display technology (e.g., light-emitting diodes such as an array of organic light-emitting diodes, liquid crystal display pixels, plasma-based pixels, etc.). An arrangement in which display structures 106 are based on liquid crystal display (LCD) technology is sometimes described herein as an example. The use of LCD structures in display structures 106 is, however, merely illustrative. Display structures 106 may, in general, be formed from any suitable type of display structures. Moreover, use of displays structures 106 in portable computers and other electronic devices with upper and lower housings is merely illustrative. Display structures 106 may be used in a handheld electronic device, a television, a tablet computer, a desktop computer monitor, or other electronic equipment.

Figure 2:
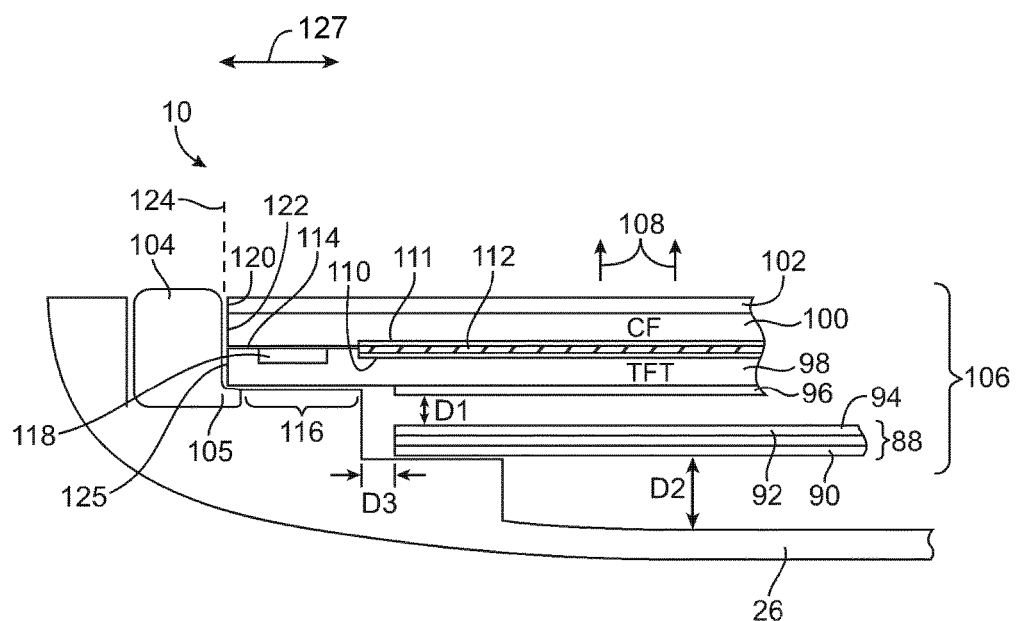
FIG. 2 is a cross-sectional side view of illustrative display structures in an electronic device such as a portable computer in accordance with an embodiment of the present invention.

As shown in FIG. 2, display structures 106 may have an upper polarizer layer 102 and a lower polarizer layer 96. Layers such as layers 102 and 96 may be formed from one or more sublayers. For example, layer 102 may include an antireflection coating layer, a stretched plastic layer that forms the active polarizer portion of layer 102, a polymer compensation layer, etc. Light guide structures 88 may provide backlight for structures 106. Light-guide structures 88 may include reflective structures such as reflective sheet 90 (e.g., white polyester), light-guide panel 92, and optical films 94. Optical films 94 may include a diffuser layer and light collimating layers (as an example). If desired, light reflection functions may be provided by housing 26. Housing 26 may be formed from a reflective material such as metal and/or the interior surfaces of housing 26 may be coated with a reflective coating such white paint or ink, silver paint or ink, a reflective material such as chromium, etc. In arrangements in which housing 26 is highly reflective, some or all of reflective sheet 90 may be omitted.

Clearances D2 and D1 help prevent damage to display structure 106 during use of device 110. In a typical arrangement, clearance D2 may be about 1.2 to 1.8 mm and clearance D1 may be about 0.11 mm. End clearance D3 may be about 0.3 mm.

Light from a light-emitting diode array or other backlight source is provided to an edge of light guide panel 92. Panel 92 and the other structures in light guide structures 88 direct this light upwards in direction 108 through thin film transistor layer 98 and color filter layer 100.

Thin-film transistor substrate glass layer 98 may contain thin-film transistors in array 110. Color filter glass layer 100 may contain an array of optical filters of different colors to provide display structures 106 with the ability to display color images. Color filter layer 100 may be formed from glass into which dye of different colors has been impregnated, from a glass layer coated with a pattern of colored dye, from a glass or plastic layer that is covered with a pattern of thin colored filter structures (e.g., filters formed from polymer or glass containing dye), or any other suitable color filter structures. A ground plane structure such as ground plane 111 may be formed on the lower surface of color filter layer 100. Ground plane 111 may, for example, be formed from a rectangular thin film of indium tin oxide or other transparent conductive material. Liquid crystal layer 112 may be controlled by the electric fields produced between the thin-film transistors of array 110 and ground plane 111.

Display structures 106 may, if desired, be covered by a layer of cover glass. The cover glass layer adds bulk to device 10, so when size and weight are to be minimized, the cover glass may be omitted as shown in FIG. 2. A cosmetic trim structure such as a bezel may cover the edge of display structures 106 (e.g., in the vicinity of gasket 104) or, as shown in FIG. 2, the display for device 10 may be implemented without a bezel to minimize the thickness of the non-display structures at the edge of housing 26.

Color filter layer 100 may be formed of a durable clear layer (e.g., a strong glass or plastic) that resists damage from contact. Anti-scratch coatings may also be provided on the surface of color filter layer 100 (e.g., as part of polarizer layer 102 or above polarizer layer 102).

To hide the peripheral portions of display structures 106 that lie along the outer edges of display housing 26 from view, an opaque material such as ink layer 114 may be incorporated around the periphery of display structures 106 to form a border. Opaque layer 114 may be formed on the underside of color filter layer 100 or on the upper surface of thin-film transistor glass layer 98 (as examples). The opaque material may have any suitable color (e.g., black, grey, silver, white, blue, red, etc.).

With the arrangement of FIG. 2, color filter layer 100 and thin-film transistor layer 98 extend outwardly (in the leftward direction in the orientation of FIG. 2) so as to form an overhanging portion 116 that is supported by the matching ledge in housing 26. If desired, only color filter layer 100 may extend in this way (e.g., so that the overhanging portion of layer 100 rests on the ledge formed by housing 26). In this type of arrangement, the thin-film transistor layer may extend only as far as light-guide structures 88 of FIG. 2. If desired, portions of gasket 104 may be interposed between display structures 106 and housing 26 in region 116, as illustrated by protruding lower lip portion 105 of gasket 104 in the example of FIG. 2. Display driver circuitry 118 may, if desired, be formed in region 116 (e.g., as part of thin film transistor layer 98 or in a chip mounted on thin film transistor layer 98 or color filter layer 100).

As shown in FIG. 2, edge 120 of polarizer layer 102 and edge 122 of color filter layer 100 may be laterally aligned (i.e., these edges may be placed at the same lateral distance along dimension 127 so that they are even with each other and are horizontally aligned at vertical axis 124). Edge 120 and edge 122 may, for example, be aligned within a lateral tolerance of 100 microns or less, 50 microns or less, or 25 microns or less. Edge 125 of thin film transistor glass layer 98 may also be aligned at axis 124. When polarizer layer 102 is aligned with the underlying glass layers in this way, the outer surface of display 14 has an attractive appearance and potential reliability issues that might arise in using an oversized polarizer layer may be avoided.

Minimal overlap between polarizer layer 102 and color filter layer 100 may be obtained using a trimming operation. With one suitable arrangement, which is sometimes described herein as an example, trimming operations may be implemented using a computer-controlled laser trimming tool.

Polarizer layer 102 may be attached to the planer outer surface of color filter layer 100 using any suitable technique. For example, polarizer layer 102 may be laminated onto the surface of color filter layer 100 using pressure sensitive adhesive. A roller or other tool may be used to press the polarizer layer onto the color filter layer with sufficient force to activate the adhesive.

Driver circuitry 118 of FIG. 2 may be implemented using integrated circuits. These integrated circuits may be mounted on the upper surface of thin film transistor layer 98 or on the underside of color filter glass 100. FIGS. 3, 4, 5, and 6 are cross-sectional side views of some of the display structures of FIG. 2 showing how driver circuits 118 may be mounted on thin film transistor layer 98 and covered with a planarized layer of encapsulant.

Figure 3:
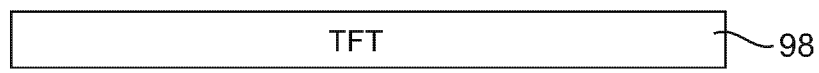
FIGS. 3, 4, 5, and 6 are cross-sectional side views of display structures such as a color filter glass layer and thin film transistor glass layer on which driver circuitry has been formed during successive stages of fabrication in accordance with an embodiment of the present invention.

Initially, no color filter layer may be attached to thin film transistor layer 98 (FIG. 3).

Figure 4:
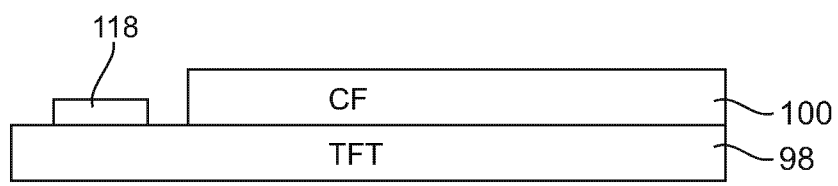

Following attachment of color filter layer 100 (e.g., using pressure sensitive adhesive) and driver circuits 118, thin film transistor layer 98 may appear as shown in FIG. 4. Driver circuits 118 may be formed near the edge of thin film transistor layer 98, so as not to obstruct any of the main central viewing area of display 14. In a typical arrangement, there may be two or more thin film transistor array driver circuits 118, each of which is located at a different position along the edge of thin film transistor layer 98 (i.e., at locations that are further into the page in the orientation of FIG. 4). Integrated circuits 118 may be connected to the thin film transistors in thin film transistor layer 98 using solder and conductive traces.

Figure 5:
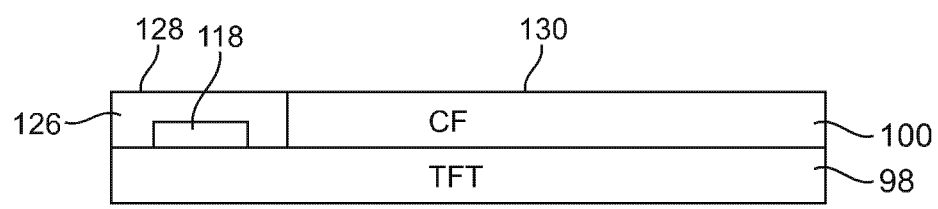

After transistor array driver circuitry 118 has been formed on thin film transistor layer 98, an encapsulating material such as encapsulant 126 may be deposited on top of circuitry 118 and planarized, as shown in FIG. 5. Encapsulating material 126 may be formed from thermally cured epoxy, ultraviolet-light-cured epoxy, other adhesives, plastics, glasses, etc. Planarization operations may be performed by mechanical polishing or using a combination of chemical and mechanical polishing (CMP) (as examples). Once planarized, upper planar surface 128 of encapsulant 126 and upper planar surface 130 of FIG. 5 will typically lie in the same plane, as shown in FIG. 5. Co-planarity of planar surface 128 and planar surface 130 may also be obtained by accurately controlling the height and flatness of surface 128 during fabrication (e.g., by using a mold, by controlling the amount of material that is deposited, etc.).

Figure 6:
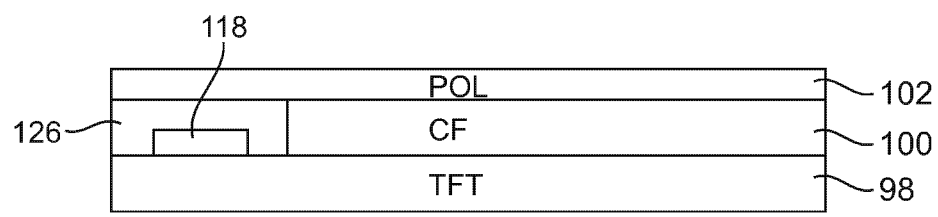

Following formation of planarized encapsulant 126, polarizer layer 102 may be laminated onto the surface of encapsulant 126 and color filter layer 100, as shown in FIG. 6. Trimming operations may be performed to ensure that the edges of polarizer 102 are aligned with the edges of color filter glass 100 (on edges such as the right hand edge in FIG. 6), the edges of encapsulant 126 (i.e., the left edge of FIG. 6). In the configuration of FIG. 6, the edges of polarizer layer 102 are also aligned with the edges of thin film transistor layer 98.

Figure 7:
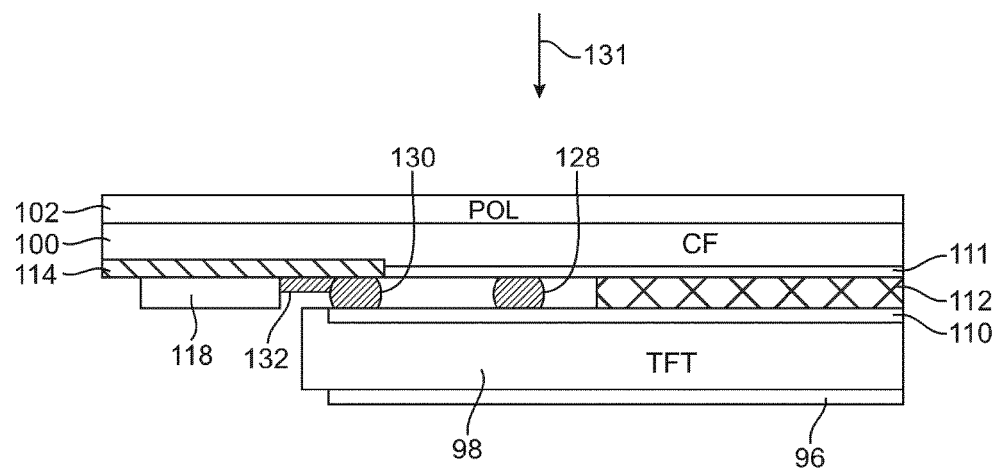
FIG. 7 is a cross-sectional side view of display structures in which driver circuitry has been mounted on an underside of a color filter glass layer in accordance with an embodiment of the present invention.

If desired, thin film transistor array driver circuits 118 may be mounted on the lower surface of color filter layer 100. This type of arrangement is shown in FIG. 7. As shown in FIG. 7, driver circuit 118 may be mounted on a layer of ink such as ink 114. Ink 114 may block driver circuit 118 from view in direction 131. Integrated circuit 118 may be connected to conductive structure 130 by conductive traces 132. Ground plane 111 may be formed on the lower surface of color filter layer 100. Ground plane 111 may be, for example, a layer of transparent conductive material such as indium tin oxide. During operation, driver circuits 118 supply control signals to thin film transistor array 110 on the surface of thin film transistor substrate 98. Electric fields are produced between the circuits in array 110 and ground plane 111. These fields control the state of individual pixel regions in liquid crystal layer 112.

Ground plane 111 may be grounded using conductive structures such as structures 128. In conventional liquid crystal displays, structures 128 are applied to the lower surface of color filter layers by applying drops of liquid using ink jet printing. When the liquid solidifies, conductive vertical structures are formed to short ground plane 111 to transistor array 110.

As shown in FIG. 7, conductive structures 130 may be used to interconnect circuitry 118 on color filter layer 100 with circuitry 110 on thin film transistor layer 98. Conductive structures 130 may be formed using the same type of process that is used to form structures 128 or using a different process. Techniques that may be used to form structures 130 include painting (e.g., applying silver paint with a brush or pad), screen printing, pad printing, using a nozzle or dropper to deposit drops of liquid precursor material such as metal-filled epoxy, sputtering, electrochemical deposition, plating, ink-jet coating, other suitable techniques, and combinations of these techniques. With one suitable arrangement, which is sometimes described herein as an example, an ink-jet printer is used to deposit a liquid such as metal-filled epoxy to form a desired pattern of structures 130 onto the underside of color filter layer 100. This process may also be used to deposit structures 128.

Once deposited on color filter layer 100, color filter layer 100 and thin film transistor layer 98 may be attached to each other to encapsulate liquid crystal layer 112. When attached in this way, the circuitry of driver circuits 118 is connected to thin film transistor array circuitry 110 via traces 132 and structures 130.

Figure 8:
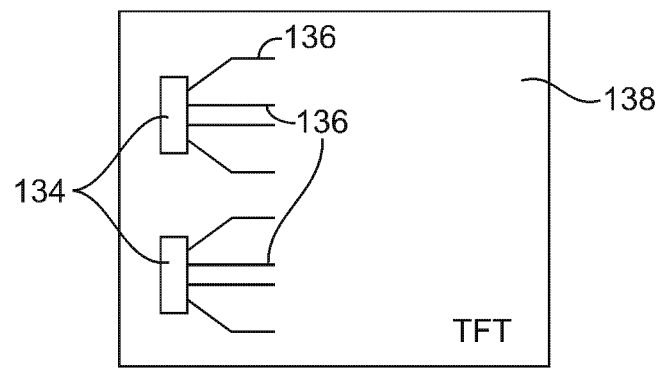
FIG. 8 is a top view of a conventional thin film transistor glass layer showing how driver integrated circuits and traces may be formed on the thin film transistor glass layer.

In conventional displays, thin film transistor driver integrated circuits 134 are connected to the thin film transistor array on thin film transistor glass 138 using conductive traces 136 on thin film transistor glass 138, as shown in FIG. 8.

Figure 9:
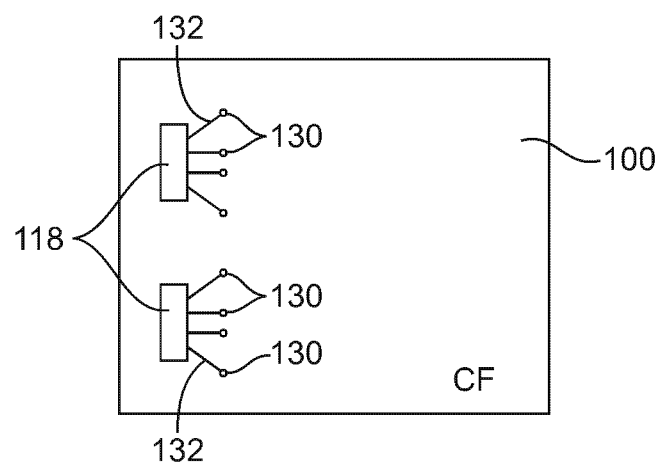
FIG. 9 is a bottom view of a color filter glass layer of the type shown in FIG. 7 showing how underside traces on the color filter glass layer may be used to connect driver integrated circuits to vertical connection structures such as ink-jet-printed conductive dots in accordance with an embodiment of the present invention.

With an arrangement of the type shown in FIG. 7, traces 132 on the surface of color filter layer 100 may be used in routing thin film transistor array signals from driver integrated circuits 118 to thin film transistor array 110. This is illustrated in more detail in the top view of FIG. 9. As shown in FIG. 9, traces 132 may form at least some of the routing functions that would conventionally be handled using traces 136 of FIG. 8. After passing vertically through conductive structures 130, these can be handled using corresponding routing lines in circuitry 110 on thin film transistor layer 98 (FIG. 7).

Assembly techniques that may be used for forming display structures such as the display structures of FIGS. 6 and 7 are illustrated in the diagrams of FIGS. 10A-10G.

In a typical manufacturing process, structures for multiple displays are initially formed in parallel on a relatively large sheet of "mother glass." As shown in FIG. 10A, mother glass 142 may contain multiple copies of color filter glass 100.

Mother glass 142 may be quartered to form smaller panels such as panel 144 of FIG. 10B.

As shown in FIG. 10C, a cutting tool such as tool 149 may be used to cut an individual color filter glass layer 100 from panel 144 of FIG. 10B (or, if desired, directly from mother glass 142 of FIG. 10C). Cutting tool 149 may use a laser, saw, or other computer-controlled cutting mechanism for cutting color filter glass 100 from panel 144 or glass 142. With one suitable arrangement, cutting tool 149 may be implemented using a multi-head free-shape diamond scriber. A scriber or other such tool may be used to create cuts with curved sections such as curved corners 148 in color filter layer 100 of FIG. 10C.

As shown in FIG. 10C, color filter layer 100 may be provided with a fiducial such as fiducial 146. This allows camera-based automatic alignment systems to be used when handling color filter layer 100 during processing. Fiducial 146 may be implemented be forming one or more metal alignment marks on the surface of layer 100 (as an example).

After forming a color filter glass layer of a desired shape, polarizer layer 102 may be laminated onto the surface of the color filter glass layer (FIG. 10D). As shown in FIG. 10D, the lateral dimensions of polarizer layer 102 may be chosen so as to be slightly larger than the corresponding lateral dimensions of color filter layer 100 (i.e., polarizer layer 102 may be oversized relative to color filter layer 100). With this type of arrangement, there is a slight overlap (overhang) in the polarizer layer 102 around the peripheral edge portion of the polarizer layer. The polarizer layer may include multiple layers of material (e.g., an antireflection coating layer, an active polarizer layer, a compensation layer, etc.) or some or all of these layers may be formed during separate lamination steps. Lamination may be performed using lamination tool 151. With a typical arrangement, lamination tool 151 presses downwards on the surface of color filter layer 100 using rollers. Pressure sensitive adhesive on the underside of polarization layer 102 attaches polarization layer 102 to the upper surface of color filter layer 100.

Following lamination of oversized polarization layer 102 onto the surface of color filter glass layer 100, excess polarizer may be removed. In particular, a trimming tool may be used to cut away undesired portions of the polarizer layer. The trimming tool may be based on blade-type cutters, saws, press cutting equipment, or other suitable trimming equipment. With the illustrative arrangement of FIG. 10E, trimming equipment has been implemented using a laser such as laser 156. Laser 156 may be a diode laser, a gas laser, a glass laser, a continuous-wave laser, a pulsed laser, or any other suitable type of laser. With one suitable arrangement, laser 156 is a carbon dioxide laser that produces infrared light. Infrared light is absorbed by polarizer layer 102, which facilitates efficient cutting operations.

The position of laser beam 157 may be controlled using controllable mirrors such as mirror 159 and/or by controlling the position of the workpiece (i.e., polarizer 102, adhesive 168, and color filter layer 100) using translation stages such as translation stage 158. Camera 152 may be used to capture images of the workpiece and, using images of fiducial 146 (FIG. 10C), may assist in aligning the workpiece relative to beam 157. Control unit 154 may control laser trimming operations by controlling the power of laser 156, by controlling the image acquisition functions of camera 152, by controlling the position of beam 157 (e.g., by controlling mirror 159 and/or translation stage 158 or other positioning equipment), etc. As polarizer 102 is trimmed, excess pieces of polarizer such as piece 102' of FIG. 10E may be removed from the workpiece.

Trimming operations may be used to remove pieces of overhanging polarizer along the edges of color filter glass layer 100 so that the edges of polarizer 102 are accurately aligned with the edges of layer 100 (i.e., within a tolerance 100 microns or less, within 50 microns or less, etc.). Trimming operations may also be used to remove portions of polarizer 102 elsewhere on color filter layer 100. For example, trimming operations may be used to remove a circular piece of polarizer 102 to form a window opening for a camera.

Peripheral pieces of polarizer 102 overhang the edges of color filter layer 100 and are therefore not attached to any other structures. During trimming, peripheral pieces of polarizer such as piece 102' of FIG. 10E are therefore not generally difficult to remove from the workpiece. Unless care is taken, however, the use of adhesive 168 to attach polarizer 102 to the surface of color filter layer 100 can make it challenging to remove other trimmed portions of polarizer 102.

One way to facilitate the removal of trimmed pieces of polarizer 102 from color filter layer 100 involves the introduction of barrier layer material under selected portions of adhesive 168. The barrier layer material may be formed from a liquid (e.g., water, solvent, oil, or other substances) or a solid (e.g., plastic, metal, glass, etc.). In areas where the barrier layer material is present, adhesive 168 is prevented from adhering effectively to the upper surface of color filter layer 100, thereby facilitating subsequent removal of the portion of polarizer that lies above the barrier layer material.

If desired, barrier layer structures may be provided in the form of thin layers of plastic ("shims"). An example of this type of arrangement is shown in the cross-sectional side view of FIG. 10F. During the lamination process, (FIG. 10D), adhesive 168 may be formed on the underside of polarizer 102 (e.g., by spray coating, using a roller, etc.). Before laminating polarizer 102 onto the surface of color filter layer 100, shim 160 (or other suitable barrier layer structure) may be attached to the underside of polarizer 102. Shim 160 may, for example, be placed in contact with adhesive 168 in a location at which it is desired to form an opening in polarizer 102. After shim 160 has been placed on this portion of adhesive 168, lamination tool 151 may laminate polarizer 102 (and the attached shim) onto the surface of the color glass layer to form an arrangement of the type shown in FIG. 10F. Laser trimming equipment of the type shown in FIG. 10E may be used to cut through polarizer 102 around the periphery of shim 160 (shown as edge locations 162 in FIG. 10F). To avoid damaging shim 160, laser light may be focused adjacent to—but just beyond— the outer edges of shim 160 during trimming.

After the laser cut along the edge of shim 160 has been made, portion 164 of polarizer 102 will be attached only to shim 160 and not to the remaining polarizer on color filter layer 100. Portions 166 of polarizer 102 are attached to color filter layer 100 by adhesive 168, so portions 166 will remain in place following trimming. Shim 160 is not attached to color filter layer 100 by adhesive, so shim 160 and portion 164 may be removed from the workpiece. The shape of shim 160 and the shape of the corresponding laser cut in polarizer 102 that is used to liberate shim 160 and portion 164 may be circular, rectangular, etc. FIG. 10G is a view of the upper surface of color filter layer 100 after a circular shim 160 has been removed from color filter layer 100 to form circular camera hole 150. Once color filter layer 100 has been assembled to form a complete display, a camera module may be mounted behind hole 150.

In arrangements in which a layer of ink is formed around the periphery of the color filter layer to block components from view, the portion of the ink layer that lies behind the hole may be omitted to ensure that the camera module will not be blocked by ink. Because no polarizer 102 is present in the opening, camera operation is not adversely affected by the presence of polarizer.

Although formation of a single opening is illustrated in FIGS. 10A-10G, any suitable number of polarizer openings may be formed if desired. Moreover, additional layers of films may be laminated and trimmed in the same way. For example, an antireflection coating layer may be laminated onto the surface of polarizer 102 (e.g., in a situation in which polarizer layer 102 does not already contain an antireflection coating layer).

Figure 11:
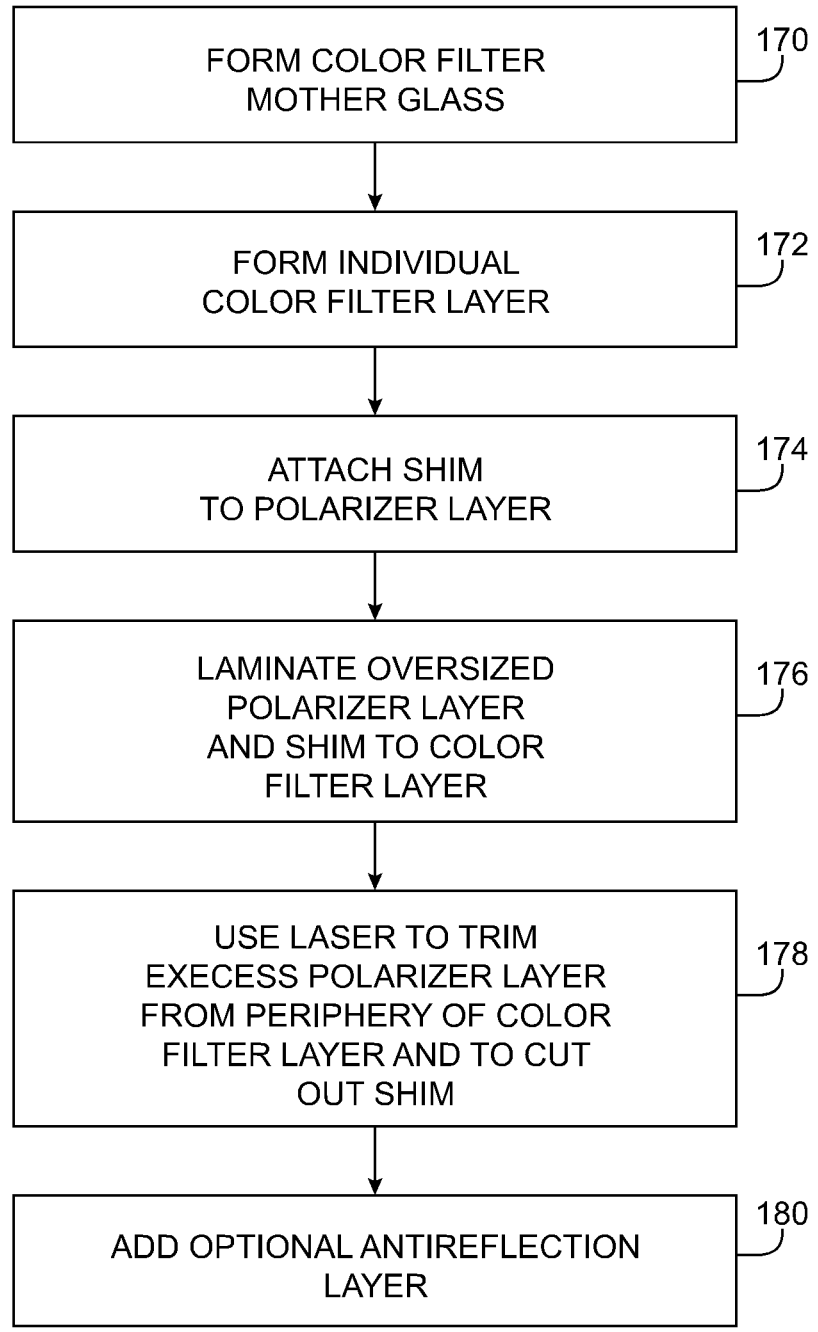
FIG. 11 is a flow chart of illustrative steps involved in forming display structures for an electronic device in accordance with an embodiment of the present invention.

Illustrative steps involved in forming display structures for device 10 are shown in FIG. 11.

At step 170, display structures (e.g., color filters) may be fabricated as part of mother glass 142 of FIG. 10A.

After forming the color filter mother glass, the mother glass may optionally be divided into smaller panels (e.g., mother glass 142 may be quartered to form panels such as panel 144 of FIG. 10B).

At step 172, cutting tool 149 (e.g., a diamond scribing tool) may be used to cut an individual piece of color filter glass from mother glass 142 or panel 144 (i.e., layer 100 of FIG. 10C).

At step 176, adhesive barrier structures such as shim 160 may be attached to the underside of adhesive layer 168 and associated polarizer layer 102 and the resulting masked polarizer layer may be laminated onto the upper surface of color filter layer 100 using lamination tool 151.

At step 178, laser trimming equipment of the type described in connection with FIG. 10E or other suitable cutting equipment may be used to remove the overlapping edges of polarizer 102 and may be used to cut out shim 160 to form opening 150. Because laser trimming is used to trim away excess edge portions of polarizer 102, the edges of polarizer 102 may be accurately aligned with the edges of color filter glass 100. Following trimming operations to remove the peripheral edge portions of the oversized polarizer layer, the edges of the polarizer will be even with the edges of the color filter glass layer. Because of the use of shim 160 or other such adhesive barrier materials, adhesive 168 is prevented from adhering to areas of color filter layer 100 where polarizer openings are desired.

As illustrated by step 180, some or all of the operations of steps 170, 172, 174, 176, and 178 may be repeated as desired (e.g., to add additional layers of material such as antireflection coating layers that have edges that are aligned with the edges of color filter glass 100). If desired, planarization operations may be performed to help ensure that the top surface of each layer is planar before subsequent layers are laminated. For example, if a circular hole has been formed in the polarizer layer and it is desired to deposit a separate antireflection layer, a liquid such as ultraviolet curable epoxy or other planarizing substance may be deposited into the circular hole. This planarizing substance can be used to fill the circular hole (i.e., by filling the hole sufficiently that the upper surface of the epoxy fill is vertically aligned and therefore co-planar with the planar outer surface of the polarizer). After planarizing in this way, the surface of the polarizer will be smooth and even, thereby facilitating the attachment of subsequent layers (e.g., the antireflection coating).

Approaches of the type shown in FIG. 11 may be used in forming display structures of the type shown in FIG. 6 or FIG. 7 (as examples). For example, a structure of the type shown in FIG. 5 may be formed before polarizer layer 102 is laminated onto the color filter by attaching thin film transistor layer 98 to the rear surface of the color filter, mounting driver circuits 118, and forming planarized encapsulant structure 126 over circuits 118. Structures of the type shown in FIG. 7 without polarizer layer 102 may also be formed before polarizer layer 102 is laminated onto the color filter at step 176. If desired, some of these fabrication steps (e.g., the attachment of thin film transistor layer 98 to color filter layer 100) may take place after the polarizer lamination and trimming operations of FIG. 11 have been performed.

The foregoing is merely illustrative of the principles of this invention and various modifications can be made by those skilled in the art without departing from the scope and spirit of the invention.

What is claimed is:

1. A display having an active area surrounded by an inactive area, the display comprising:
   a color filter layer and a thin-film transistor layer that form an array of display pixels in the active area;
   a layer of opaque masking material that forms an opaque border in the inactive area;
   a display driver integrated circuit that controls the array of display pixels mounted on the color filter layer, wherein the layer of opaque masking material overlaps the display driver integrated circuit; and
   a polarizer layer having an opening in the inactive area, wherein the layer of opaque masking material comprises an opening that is aligned with the opening in the polarizer layer.

2. The display defined in claim 1, wherein the color filter layer comprises a substrate having first and second opposing surfaces, wherein the polarizer layer is formed on the first surface, and wherein the layer of opaque masking material is formed on the second surface.

3. The display defined in claim 2, further comprising conductive traces formed on the second surface of the substrate.

4. The display defined in claim 3, wherein the thin-film transistor layer comprises an array of thin-film transistors, and wherein the conductive traces electrically couple the display driver integrated circuit to the array of thin-film transistors.

5. The display defined in claim 4, further comprising a conductive structure that extends from the color filter layer to the thin-film transistor layer and electrically connects the conductive traces to the array of thin-film transistors.

6. The display defined in claim 5, wherein the layer of opaque masking material also overlaps the conductive traces and the conductive structure.

7. An electronic device, comprising:
   a housing;
   a display mounted in the housing, wherein the display comprises a color filter layer and a thin-film transistor layer;
   an integrated circuit mounted to the color filter layer; and
   a light-based component mounted in the housing, wherein the light-based component receives light through at least a portion of the display, wherein the display further comprises a polarizer layer having an opening, wherein the light-based component receives light through the opening in the polarizer layer, wherein the display further comprises a layer of opaque material that overlaps the integrated circuit and hides the integrated circuit from view, wherein the layer of opaque material has an opening that is aligned with the opening in the polarizer layer, and wherein the light-based component receives light through the opening in the layer of opaque material.

8. The electronic device defined in claim 7, wherein the light-based component is a camera.

9. The electronic device defined in claim 7, further comprising:
   a conductive structure interposed between the color filter layer and the thin-film transistor layer that electrically connects the integrated circuit to the thin-film transistor layer.

10. The electronic device defined in claim 9, wherein the integrated circuit is a display driver integrated circuit.

11. An electronic device comprising:
    a housing;
    a display mounted in the housing, wherein the display comprises:
       a thin-film transistor layer comprising a substrate and an array of thin-film transistors formed on the substrate;
       a transparent display layer that overlaps the thin-film transistor layer, wherein the array of thin-film transistors is interposed between the substrate and the transparent display layer, wherein the transparent display layer has first and second opposing surfaces, and wherein the second surface is interposed between the first surface and the array of thin-film transistors;
       a display driver integrated circuit mounted to the transparent display layer, wherein the display driver integrated circuit is mounted to the second surface;
       a layer of opaque masking material that overlaps the display driver integrated circuit, the layer of opaque masking material having an opening;
       a polarizer layer having an opening that is aligned with the opening in the layer of opaque masking material; and
    a light-based component that receives light through at least a portion of the display.

12. The electronic device defined in claim 11 wherein the polarizer layer is on the first surface of the transparent display layer.

13. The electronic device defined in claim 12, further comprising:
   conductive structures on the second surface of the transparent display layer that electrically connect the display driver integrated circuit to the array of thin-film transistors.

* * * * *